UNITED STATES PATENT OFFICE 2,304,391

CEMENT

Oswald T. Zimmerman, Durham, N. H., assignor to Kerr Dental Manufacturing Company, a corporation of Michigan No Drawing. Application October 23, 1939, Serial No. 300,841

13 Claims. (Cl. 106—35)

The invention relates to hydraulic cements.

The object of the invention is to obtain an improved hydraulic cement composition which has superior properties to those heretofore known.

In the present state of the art, it is known that cements may be made by heating together mixtures of oxides to a temperature sufficiently high to promote reaction and subsequently grinding the mass. Cements prepared in this manner are capable of combining with water and setting to hard masses. Portland cements and the aluminous cements are of this type. Portland cements have the approximate compositions $SiO_2$ 19–24%, $CaO$ 61–65%, $Al_2O_3$ 5–10%, and smaller amounts of $Fe_2O_3$, $MgO$, alkalies and $SO_3$. Aluminous cements consist essentially of: $Al_2O_3$ 40–45%, $CaO$ 32–44%, $SiO_2$ 2–10%, $Fe_2O_3$ 4–19% and smaller amounts of $MgO$ and other materials present as impurities in the raw materials. It can be seen that the essential constituents of Portland cement are $SiO_2$ and $CaO$, while the essential constituents of aluminous cements are $Al_2O_3$ and $CaO$. The $Al_2O_3$ in Portland cement, though of minor importance, does contribute some properties to the cement.

My invention, in its broader aspects, is based upon the discovery that if beryllium oxide (BeO) is substituted in whole or in part for $Al_2O_3$ and/or $Fe_2O_3$ in cements of the above compositions or in cements whose compositions are greatly different from these, cements having greatly superior properties result. Such beryllium containing cements have smoother, harder and more impervious surfaces than the corresponding cements without beryllium and in addition have much lower solubility in water and in solutions. The fact that beryllium oxide can be substituted for aluminum oxide is by no means the obvious substitution of a chemical equivalent. Beryllium is in group II of the periodic table of elements as are barium, strontium and calcium, while aluminum is in group III.

Consequently it was not to be expected that BeO could be used to replace $Al_2O_3$ but rather if any substitution could be made at all it would be by replacement of CaO with BeO. This, however, is contrary to the facts, for excellent cements can be made from combinations of the oxides of calcium and beryllium, while combinations of the oxides of beryllium and aluminum are unsatisfactory.

In replacing aluminum oxide with beryllium oxide, I have often found it advantageous to replace one mol. of aluminum oxide in a known cement formula with on mol. of beryllium oxide, but my invention is by no means limited to such molecular substitution because I have found considerable improvement in certain properties such as hardness, strength, setting properties and insolubility by substitutions of either less or more than mol. per mol.

Although I have mentioned the fact that beryllium oxide can be substituted for aluminum oxide and/or iron oxide in formulas of well known cements with a subsequent improvement in properties, the value of beryllium oxide is not limited to such cases for I have been able to make excellent cements from the combination of beryllium oxide with other oxides in widely varying proportions. Furthermore, some of the other oxides I have used are the oxides of elements not previously used in cements of this type, or if they were used their use was limited to very small amounts present as impurities in the raw materials and not in sufficient quantities to contribute desirable properties. In fact, these small amounts of impurities are usually considered detrimental to the properties of the cement.

I have made excellent cements from combinations of the oxides of the following elements: beryllium and calcium, beryllium and strontium, beryllium, calcium and strontium, beryllium, calcium, strontium and barium, beryllium, magnesium, calcium, strontium and barium, beryllium, aluminum and calcium, beryllium, aluminum and strontium, beryllium, aluminum and barium, beryllium, aluminum and magnesium, beryllium, aluminum, magnesium and calcium, beryllium, aluminum, strontium and magnesium. In addition, I have made cements of the above combinations with the additions of silicon dioxide, cerium oxide, thorium oxide and iron oxide, either singly or in combination.

While the above combinations are representative of my invention, it should be understood that in its broader aspects the invention is not limited to the use of beryllium oxide in cements of any particular combination of oxides, but to its use in any combination of oxides which result in cements that will harden when mixed with water.

While in the above description I have referred to the oxides of various metals including beryllium, it should be understood that it is not necessary that pure oxides should be used as raw materials in the preparation of the cements of my invention. Equivalent materials are salts which decompose on heating and natural ores containing the desired metals. Thus the raw materials for introducing beryllium oxide into the cement include beryllium salts which decompose on heating and natural ores containing beryllium.

In the following illustrative examples of my invention, I have listed various combinations of metal oxides or equivalent compounds. In each case the materials are thoroughly mixed, fused in a suitable furnace such as an arc furnace, cooled, crushed and ground into a finely divided powder. Alternatively the mixed materials may be heated to incipient fusion and the clinker resulting therefrom is cooled and ground. Again it is not necessary to resort to fusion, for if the materials are heated to temperatures appreciably below the fusion point, reaction will take place in the solid phase and the resulting material after grinding will be a satisfactory cement.

*Example 1*

|  | Parts |
|---|---|
| Beryllium oxide | 30.8 |
| Calcium oxide | 69.2 |

*Example 2*

|  | Parts |
|---|---|
| Beryllium oxide | 37.2 |
| Calcium carbonate | 62.8 |

*Example 3*

|  | Parts |
|---|---|
| Beryllium oxide | 20.3 |
| Strontium carbonate | 62.6 |
| Magnesium oxide | 17.1 |

*Example 4*

|  | Parts |
|---|---|
| Beryllium oxide | 20.2 |
| Strontium carbonate | 79.8 |

*Example 5*

|  | Parts |
|---|---|
| Silicon dioxide | 26.6 |
| Beryllium oxide | 3.2 |
| Calcium oxide | 66.2 |
| Magnesium oxide | 4.0 |

*Example 6*

|  | Parts |
|---|---|
| Aluminum oxide | 34.3 |
| Calcium carbonate | 53.9 |
| Beryllium oxide | 11.8 |

*Example 7*

|  | Parts |
|---|---|
| Aluminum oxide | 54.7 |
| Calcium carbonate | 33.6 |
| Beryllium oxide | 11.7 |

*Example 8*

|  | Parts |
|---|---|
| Aluminum oxide | 30.4 |
| Calcium carbonate | 23.9 |
| Strontium carbonate | 35.2 |
| Beryllium oxide | 10.5 |

*Example 9*

|  | Parts |
|---|---|
| Aluminum oxide | 37.1 |
| Calcium carbonate | 18.2 |
| Magnesium carbonate | 15.3 |
| Strontium carbonate | 13.4 |
| Beryllium oxide | 16.0 |

Depending upon the use to which the cements of my invention are to be put, it is necessary to adjust the setting time to a proper value. This can be done by the use of accelerators, retarders or combinations of both.

It is also to be understood that the various cements produced in accordance with my invention may be used alone or two or more cements of different compositions can be mixed to give desirable combinations of properties.

Cements made according to this invention can be mixed with water to give hard masses. If desired, coloring materials such as pigments or dyes or inert materials such as sand can be added to the cement.

What I claim as my invention is:

1. A hydraulic cement comprising the heat reaction product of beryllium oxide and calcium oxide, said product being capable when finely divided and mixed with water of setting to a hard mass.

2. A hydraulic cement comprising the heat reaction product of the oxides of beryllium, calcium and aluminum, said product being capable when finely divided and mixed with water of setting to a hard mass.

3. A hydraulic cement comprising the finely divided heat-reaction product of a beryllium compound of the class consisting of beryllium oxide and beryllium salts which are decomposable by heat to form beryllium oxide with a compound of the class consisting of oxides and salts which are decomposable by heat to form oxides of calcium and strontium, said finely divided compound being capable when mixed with water of setting to a hard mass.

4. A hydraulic cement comprising the finely divided heat-reaction product of beryllium oxide and one or more oxides of a metal of the class consisting of calcium and strontium, said finely divided product being capable when mixed with water of setting to a hard mass.

5. A hydraulic cement comprising the finely divided heat-reaction product of aluminum oxide and beryllium oxide and one or more oxides of a metal of the class consisting of calcium and strontium, said finely divided product being capable when mixed with water of setting to a hard mass.

6. A hydraulic cement comprising the finely divided heat-reaction product of 2 to 50% by weight of beryllium oxide and one or more oxides of the class consisting of calcium oxide and strontium oxide, said finely divided product being capable when mixed with water of setting to a hard mass.

7. A hydraulic cement comprising the finely divided heat-reaction product of 15 to 50% by weight of beryllium oxide and one or more oxides of the group consisting of calcium oxide and strontium oxide, said finely divided product being capable when mixed with water of setting to a hard mass.

8. A hydraulic cement comprising the finely divided heat-reaction product of 15 to 50% of beryllium compound of the class consisting of beryllium oxide and beryllium salts which are decomposable by heat to form beryllium oxide with a compound of the class consisting of oxides and salts which are decomposable by heat to form oxides of calcium and strontium, said finely divided compound being capable when mixed with water of setting to a hard mass.

9. A hydraulic cement comprising the finely divided heat-reaction product of 15 to 50% beryllium oxide and calcium oxide, said product being capable when mixed with water of setting to a hard mass.

10. A hydraulic cement comprising the finely divided heat-reaction product of 15 to 50% of beryllium oxide, calcium oxide and aluminum oxide, said product being capable when mixed with water of setting to a hard mass.

11. A hydraulic cement comprising the finely divided heat-reaction product of 15 to 50% by weight of beryllium oxide, aluminum oxide and one or more oxides of the class consisting of calcium oxide and strontium oxide, said finely divided product being capable when mixed with water of setting to a hard mass.

12. A hydraulic cement comprising the heat-reaction product of beryllium oxide and strontium oxide, said product being capable when finely divided and mixed with water of setting to a hard mass.

13. A hydraulic cement comprising the finely divided heat-reaction product of 15–50% beryllium oxide and strontium oxide, said product being capable when mixed with water of setting to a hard mass.

OSWALD T. ZIMMERMAN.